Oct. 18, 1927. 1,645,856

J. C. EICHELBERGER

HEADER REEL

Filed Nov. 8, 1926

INVENTOR.
J. C. Eichelberger
BY
ATTORNEY

Patented Oct. 18, 1927.

1,645,856

UNITED STATES PATENT OFFICE.

JOHN C. EICHELBERGER, OF STOCKTON, CALIFORNIA.

HEADER REEL.

Application filed November 8, 1926. Serial No. 146,952.

This invention relates to improvements in reels such as are used in connection with the sickle bars of headers to hold the grain in proper position to be acted on by the sickle bar and to then cause the grain as cut to be deposited onto the header draper.

The principal object of my invention is to provide a reel for use with any grain crop so constructed that the grain will be caught and drawn toward the sickle bar in an upright position without the chance of the grain being flattened down during this operation and from which the grain will readily clear itself as deposited on the draper. This, as will be evident, is radically different from the operation of ordinary reels having transversely extending slats which tend to flatten some of the grain down and having various brace members which obstruct the free passage of the grain and prevent the same from readily clearing the reel. My improved reel not only prevents the grain from being flattened and knocked down, as above stated, but tends to lift up any grain which has been previously flattened down and which would otherwise fail to be cut by the sickle.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 2:
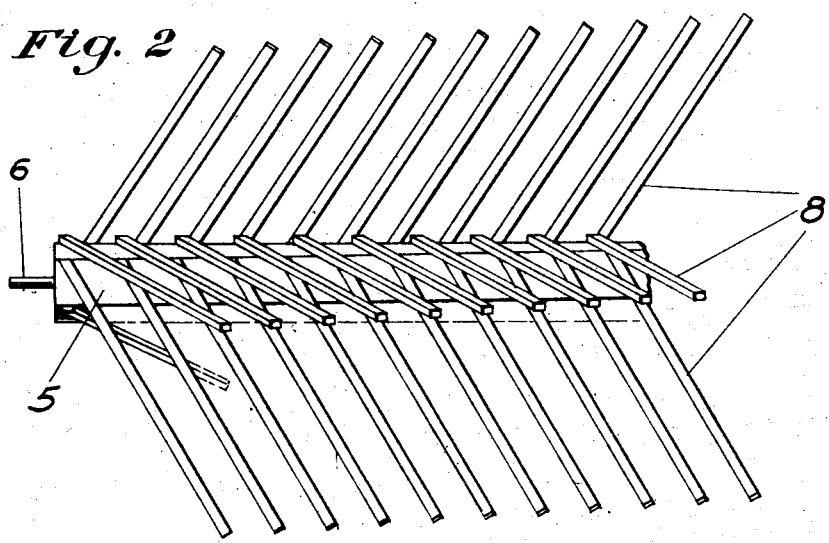
Fig. 2 is a fragmentary front elevation of the reel detached.

Referring now more particularly to the characters of reference marked on the drawings, the header frame on which the reel is mounted includes as usual upper horizontal end beams 1 and lower end beams 2 connected together to form a rigid unit. The beams 2 at their forward ends support the sickle bar structure indicated generally at 3, and a transverse draper 4 behind the sickle bar and onto which the grain as cut by the latter is delivered. My improved reel, supported by the upper beams in the same position occupied by the usual reel, comprises a drum 5, built up in any suitable manner. The drum is of somewhat small cross section and is polygonal sided instead of circular. I preferably use five sides of equal length, though the use of a greater or lesser number of sides is optional. Each end of the drum has a spindle 6 centrally disposed therein and arranged to be turnably mounted in a bearing box 7 mounted on the corresponding frame beam 1. Attached to each side face of the drum by suitable means and projecting outwardly beyond the same in one direction for a predetermined distance is a number of fingers 8, which are equal in length and parallel to each other. This arrangement, as will be evident, provides a spider-like device with the fingers tangential to a circle concentric with the spindles. The drum itself could be cylindrical but the flat sided shape obviously provides an easier means of attaching the fingers thereto. The fingers are either rectangular or circular in cross section, and in any case are sufficiently rigid so that they need no bracing or connections between the same at any points outwardly of the drum. The fingers are set at an acute angle to the axis of the drum or to the plane of longitudinal movement of the header. The angle of the fingers relative to their length is such as to cause a line projected at right angles to the drum through the outer end of any finger to intersect the side of an adjacent finger a considerable distance outwardly of the drum, as indicated in Fig. 2.

Figure 1:
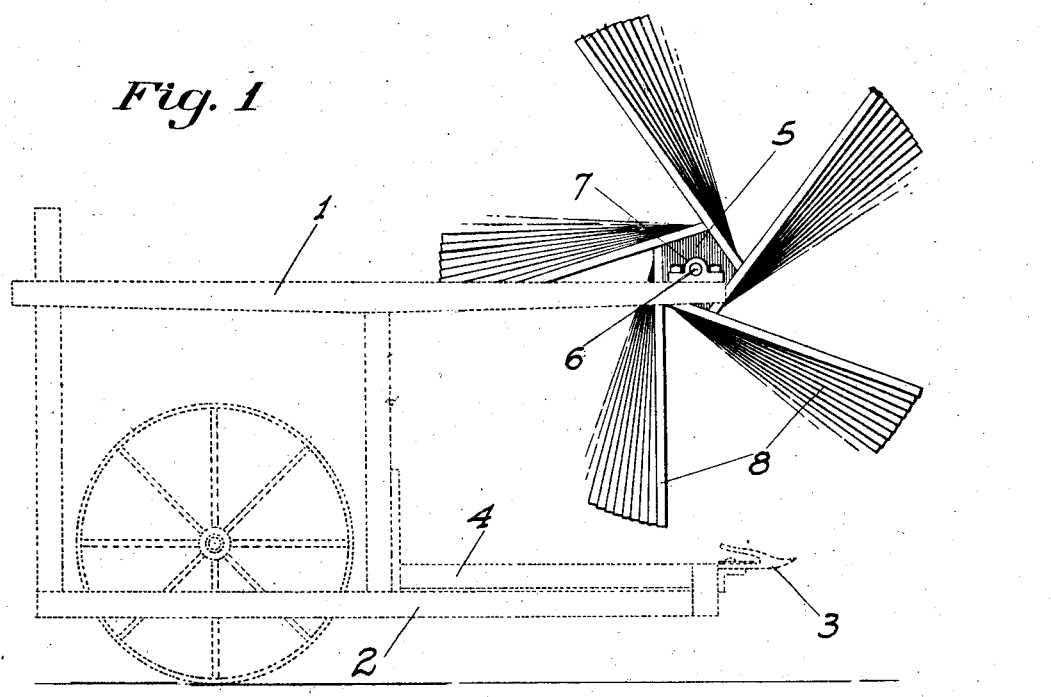
Fig. 1 is an end outline of an ordinary header frame showing my improved reel mounted thereon.

The drum is preferably twisted somewhat from end to end, so that the various side faces are slightly spiraled about the axis of the drum. This setting of the faces also causes the row of fingers attached to each face to also assume a corresponding spiral setting relative to the axis of the drum, as indicated in Fig. 1.

The result is that as the wheel revolves with the forward movement of the header all standing grain passes between the outer ends of the descending fingers. As the grain engages the sloping sides of the fingers it is shifted laterally somewhat so that the outer ends of adjacent fingers overlap the grain. Therefore instead of the grain being flattened down it is maintained in an upright position until the sickle bar cuts through the same. With the rearward movement of the fingers the cut grain of course falls onto the draper behind the sickle bar and there being no transverse slats or brace means between the sickles there is nothing to interfere with the positive and ready clearing of the fingers from the grain.

It will also be noted that as the fingers descend toward their lowermost position they will pass under and on account of their angular setting will raise any grain which has been already flattened down, thus enabling such grain, which is otherwise lost, to be cut by the sickle bar and delivered with the remainder onto the draper.

The spiral setting of the fingers as above described causes the fingers in a row, as they approach the sickle, to lie in transversely diverging relationship to the sickle. This will cause the grain to be fed to the sickle gradually from one end to the other thereof, instead of all at once. This of course will relieve the sickle of considerable operating strain, since all the cutters are not called upon to cut simultaneously.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A header reel comprising a central turnable element, and a row of fingers along said element projecting outwardly from and secured to said element in spaced relation to each other, the fingers being disposed at an angle of less than 90 degrees to the axis of the drum.

2. A header reel comprising a central turnable element, and a row of fingers along said element projecting outwardly from and secured to said element in spaced relation to each other, the fingers being disposed at an acute angle to the axis of the drum; the length of the fingers relative to said angle being such that a line projected through the outer end of any finger at right angles to the axis of the central element, will intersect an adjacent finger intermediate its ends.

In testimony whereof I affix my signature.

JOHN C. EICHELBERGER.